United States Patent
Yeh et al.

(10) Patent No.: US 12,512,917 B2
(45) Date of Patent: Dec. 30, 2025

(54) DIGITAL SIGNAL PROCESSING SYSTEM AND METHOD THEREOF

(71) Applicant: MEDIATEK INC., Hsinchu (TW)

(72) Inventors: Yang-Ting Yeh, Hsinchu (TW); Ping-Tsai Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 300 days.

(21) Appl. No.: 18/476,493

(22) Filed: Sep. 28, 2023

(65) Prior Publication Data
US 2025/0112714 A1    Apr. 3, 2025

(51) Int. Cl.
*H04B 17/309* (2015.01)
*H04B 17/20* (2015.01)

(52) U.S. Cl.
CPC ......... *H04B 17/309* (2015.01); *H04B 17/254* (2023.05)

(58) Field of Classification Search
CPC .. H04B 1/71637; H04B 1/7172; H04B 1/719; H04B 2201/70715; H04B 1/7183; H04B 1/7176; H04B 1/7174; H04B 1/74; H04B 1/04; H04B 1/3838; H04B 1/70755; H04B 1/709; H04B 1/7117; H04B 1/7163; H04B 1/7113
USPC ...................................................... 455/67.11
See application file for complete search history.

(56) References Cited

U.S. PATENT DOCUMENTS

| | | | | |
|---|---|---|---|---|
| 8,670,466 B1 * | 3/2014 | Sathe | ............... | H04J 3/0673 370/235 |
| 2003/0016773 A1 * | 1/2003 | Atungsiri | ............ | H04L 27/2695 375/343 |
| 2022/0309420 A1 * | 9/2022 | Garcia-Brosa | ......... | G06Q 50/12 |

* cited by examiner

*Primary Examiner* — Ajibola A Akinyemi
(74) *Attorney, Agent, or Firm* — McClure, Qualey & Rodack, LLP (57) ABSTRACT

A digital signal processing system is provided. The system includes a signal-receiver unit, a signal-generation unit, a tracking unit, and a period-adjustment unit. The signal-receiver unit is configured to receive a transmission signal sequence that includes the first transmission signal and the second transmission signal. The signal-generation unit is configured to generate a processing signal sequence that includes the first processing signal and the second processing signal next to the first processing signal. The tracking unit is configured to keep track of the first arrival time of the first transmission signal. The period-adjustment unit is configured to adjust the duration of the second period based on the first arrival time and the first ideal interval with a specified duration in the first period of the first processing signal, and cause the signal-generation unit to generate the second processing signal with the second period.

14 Claims, 12 Drawing Sheets

DIGITAL SIGNAL PROCESSING SYSTEM AND METHOD THEREOF

BACKGROUND OF THE INVENTION

Field of the Invention

The present disclosure relates to digital signal processing techniques in general, and more particularly to a digital signal processing system designed to address the drop/repeat burst problem caused by the phenomenon of arrival time drifting.

Description of the Related Art

"Arrival time drifting" refers to the instability or deviation from expected timing of signals in digital circuits, communication systems, or time-sensitive applications, which can be caused by various factors, including but not limited to data traffic, CPU scheduling, data processing time (e.g., time for image rendering), environmental changes (e.g., variations in temperature, voltage, and current), noise and electromagnetic interference, circuit design, and component layout. Furthermore, inconsistent periods between the transmitter and receiving ends of a signal can exacerbate the phenomenon of arrival time drifting.

Given the aforementioned diverse factors, arrival time drifting stands as an inherent phenomenon that cannot be entirely eradicated. As long as the arrival time of each signal falls within the expected processing period at the receiving end, a certain degree of drifting will not cause a problem. However, the extent of drifting may intensify over time, meaning that the signal's arrival time may trend farther away from expectation. Neglecting this phenomenon could eventually lead to "drop/repeat burst," where signals are frequently dropped or repeated at the receiving end within a certain timeframe. This can potentially impact the stability, reliability, and performance of a system.

In various contexts such as competitive gaming, high-speed communication systems, synchronous circuits, and precision timing applications, ensuring the accuracy and stability of the arrival times holds paramount significance. To address the potential challenges posed by arrival time drifting, a commonly adopted practice at the receiving end involves a multiple buffering approach, such as double buffering, triple buffering, and quad buffering. Among these, the most prevalent is double buffering, which uses two buffers to track the data or information brought by the two consecutive signals. Consequently, even if the arrival time of one signal falls outside the expected processing period, they will not be dropped or repeated. However, the multiple buffering approach may lead to increased latency and impact system performance.

In view of the aforementioned concerns, a digital signal processing solution that effectively mitigates the issues associated with arrival time drifting, preventing drop/repeat bursts without compromising system performance, would be highly desirable.

BRIEF SUMMARY OF THE INVENTION

An embodiment of the present disclosure provides a digital signal processing system. The system includes a signal-receiver unit, a signal-generation unit, a tracking unit, and a period-adjustment unit. The signal-receiver unit is configured to receive a transmission signal sequence that includes the first transmission signal and the second transmission signal next to the first transmission signal. The signal-generation unit is configured to generate a processing signal sequence that includes the first processing signal and the second processing signal next to the first processing signal. The first processing signal and the second processing signal respectively correspond to the first transmission signal and the second transmission signal. The tracking unit is configured to keep track of the first arrival time of the first transmission signal. The period-adjustment unit is configured to adjust the duration of the second period based on the first arrival time and the first ideal interval with a specified duration in the first period of the first processing signal, and cause the signal-generation unit to generate the second processing signal with the second period.

In an embodiment, the period-adjustment unit is further configured to adjust the duration of the second period by performing the following operations: checking whether the first arrival time precedes or occurs after the first ideal interval; reducing the duration of the second period if the first arrival time precedes the first ideal interval; and increasing the duration of the second period if the first arrival time occurs after the first ideal interval.

In an embodiment, the midpoint of the first ideal interval within the first period is aligned with the midpoint of the first period.

In an embodiment, the tracking unit is further configured to keep track of the arrival times of a specified number of transmission signals in consecutive order within the transmission signal sequence, and said specified number of transmission signals are directly succeeded by the second transmission signal. The period-adjustment unit is further configured to adjust the duration of the second period based on the arrival times and the specified duration.

In an embodiment, the period-adjustment unit is further configured to adjust the duration of the second period by performing the following operations: checking whether more than a certain number of the arrival times precede or occur after their corresponding ideal intervals with the specified duration; increasing the duration of the second period if more than said number of the arrival times occur after their corresponding ideal intervals; and reducing the duration of the second period if more than said number of the arrival times precedes their corresponding ideal intervals.

In an embodiment, the period-adjustment unit is further configured to adjust the duration of the second period by performing the following operations: calculating an offset value for each of the arrival times; evaluating an overall offset based on the offset values; checking if the overall offset is below a first threshold or above a second threshold; reducing the duration of the second period if the overall offset is below the first threshold; and increasing the duration of the second period if the overall offset is above the second threshold. The offset value represents the directional time difference between the arrival time and the midpoint of the corresponding ideal interval with the specified duration. The second threshold is above the first threshold, and the difference between the first threshold and the second threshold is the specified duration.

In an embodiment, the processing signal sequence is a sequence of vertical sync signals.

An embodiment of the present disclosure provides a digital signal processing method, for use in a digital signal processing system that receives a transmission signal sequence and generates a processing signal sequence. The transmission signal sequence includes the first transmission signal and the second transmission signal next to the first transmission signal. The processing signal sequence includes the first processing signal and the second processing signal next to the first processing signal. The first processing signal and the second processing signal respectively correspond to the first transmission signal and the second transmission signal. The method includes keeping track of the first arrival time of the first transmission signal. The method further includes adjusting the duration of the second period based on the first arrival time and the first ideal interval with a specified duration in the first period of the first processing signal. The method further includes generating the second processing signal with the second period.

In an embodiment, the operation of adjusting the duration of the second period includes checking whether the first arrival time precedes or occurs after the first ideal interval, reducing the duration of the second period if the first arrival time precedes the first ideal interval, and increasing the duration of the second period if the first arrival time occurs after the first ideal interval.

In an embodiment, the method further includes aligning the midpoint of the first ideal interval within the first period with the midpoint of the first period.

In an embodiment, the method further includes keeping track of the arrival times of a specified number of transmission signals in consecutive order within the transmission signal sequence, and adjusting the duration of the second period based on the arrival times and the specified duration. Said specified number of transmission signals are directly succeeded by the second transmission signal.

In an embodiment, the operation of adjusting the duration of the second period includes checking whether more than a certain number of the arrival times precede or occur after corresponding ideal intervals with the specified duration, increasing the duration of the second period if more than said number of the arrival times occur after their corresponding ideal intervals, and reducing the duration of the second period if more than said number of the arrival times precedes their corresponding ideal intervals.

In an embodiment, the operation of adjusting the duration of the second period includes calculating an offset value for each of the arrival times, evaluating an overall offset based on the offset values, checking if the overall offset is below a first threshold or above a second threshold, reducing the duration of the second period if the overall offset is below the first threshold, and increasing the duration of the second period if the overall offset is above the second threshold. The offset value represents directional time difference between the arrival time and the midpoint of its corresponding ideal interval with the specified duration. The second threshold is above the first threshold, and the difference between the first threshold and the second threshold is the specified duration.

The digital signal processing system and digital signal processing method provided by various embodiments of the present disclosure endeavor to make the arrival time of the signal fall within an ideal interval. This effectively mitigates the issues associated with arrival time drifting, preventing drop/repeat bursts without compromising system performance.

BRIEF DESCRIPTION OF THE DRAWINGS

The present disclosure can be more fully understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the present disclosure, such as "first," "second," "third," etc., are used solely for the purpose of clarity and illustration, and do not necessarily imply a sequential or precedence relationship between them. Furthermore, in the context of the present disclosure, the ordinal terms preceding signals (e.g., transmission signals, processing signals) are used to distinguish individual signals and do not necessarily denote the signal's position within a signal sequence. For example, "the first processing signal" does not necessarily refer to the initial processing signal within a processing signal sequence.

In the context of the present disclosure, the term "period" is frequently used to refer to the cycle of a signal, more precisely, the timeframe between the falling edge of that signal and the falling edge of its preceding signal. However, it should be noted that in some implementations, the term "period" can also be defined as the timeframe between two adjacent rising edges.

In the context of the present disclosure, the description for the embodiments the digital signal processing method is also applicable to the embodiments of the digital signal processing system, and vice versa.

Figure 1:
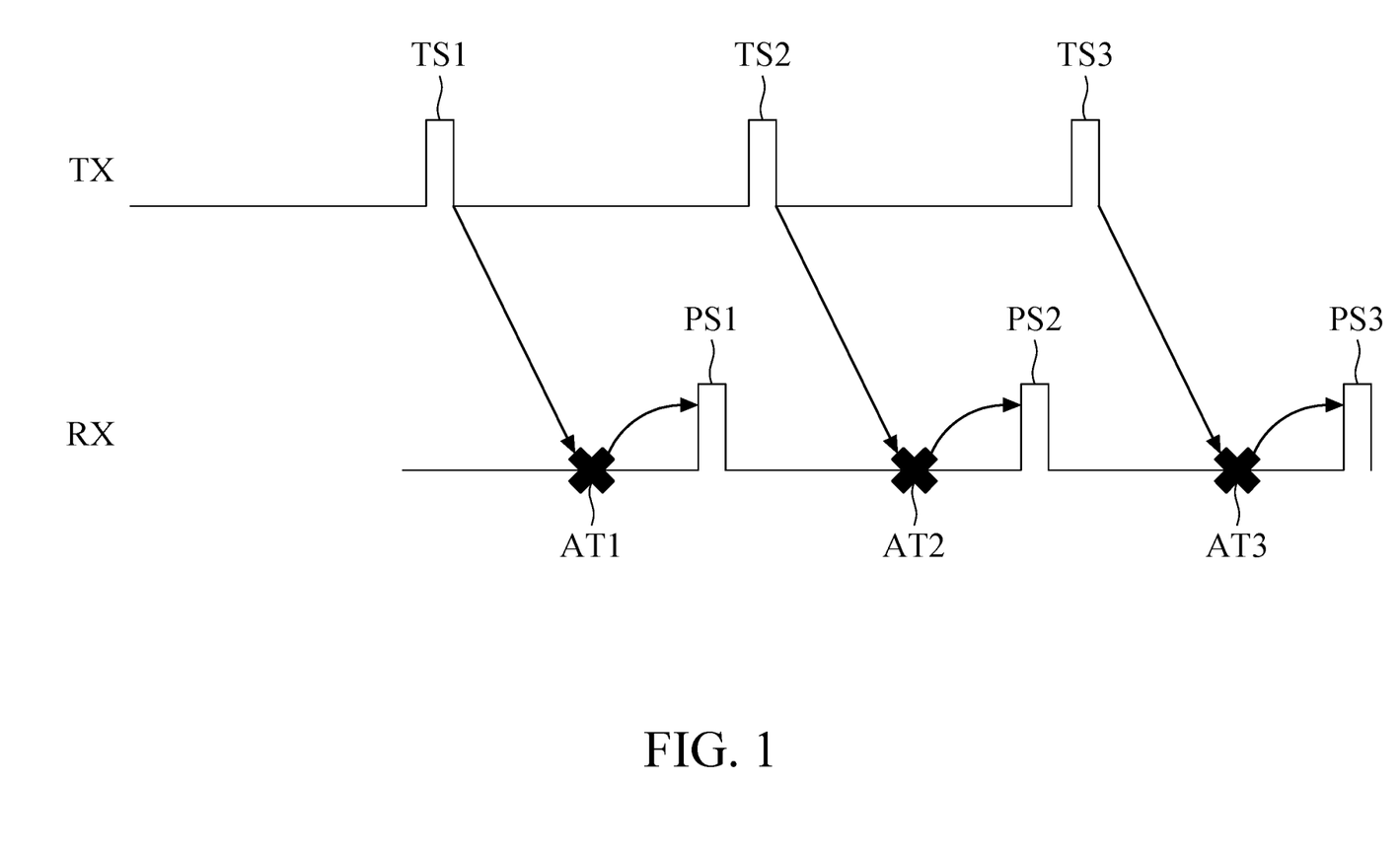
FIG. 1 illustrates time-domain graphs of a transceiver and a receiver in an ideal scenario devoid of the occurrence of arrival time drifting.

FIG. 1 illustrates time-domain graphs of a transceiver (labeled as "TX") and a receiver (labeled as "RX") in an ideal scenario devoid of the occurrence of arrival time drifting. As illustrated in FIG. 1, the transmitter TX emits a sequence of transmission signals, denoted as TS1, TS2, and TS3. In response, the receiver RX generates a corresponding series of processing signals, denoted as PS1, PS2, and PS3, for processing the data or information associated with the transmission signals TS1, TS2, and TS3, respectively. These transmission signals TS1, TS2, and TS3 traverse from the transmitter TX and reach the receiver RX at arrival times AT1, AT2, and AT3, respectively. In this ideal scenario, the propagation delay of the transmission signals TS1, TS2, and TS3 remains stable, and the periods of both the transmitter TX and the receiver RX are essentially synchronized. Therefore, the data or information received at the arrival times AT1, AT2, and AT3 can be processed by the corresponding processing signals PS1, PS2, and PS3, as expected.

Figure 2A:
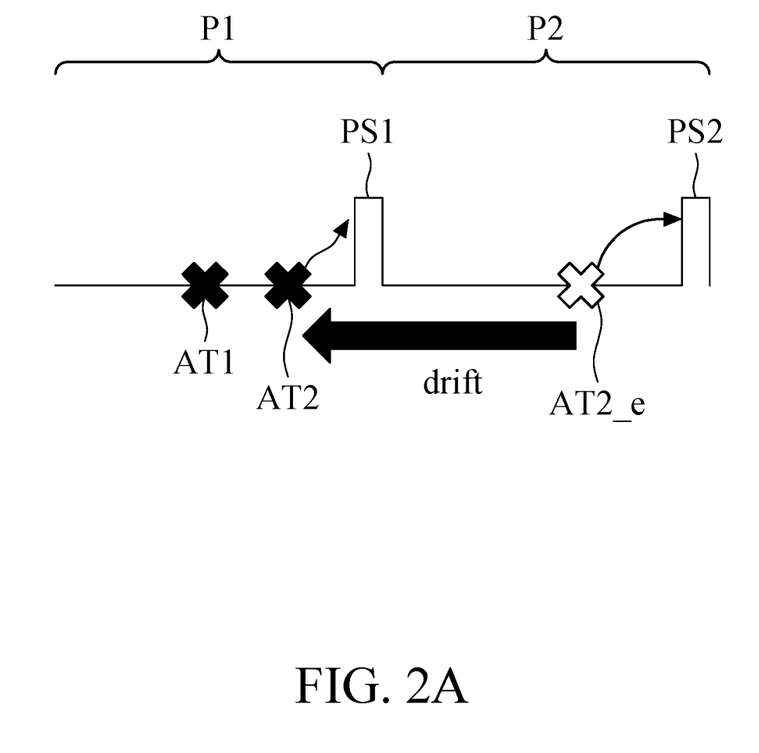
FIG. 2A is a time-domain graph illustrating a receiver's response in a scenario where a transmission signal arrives at the receiver earlier than expected, and only one buffer is used to temporarily store data for processing.

FIG. 2A is a time-domain graph illustrating a receiver's response in a scenario where a transmission signal arrives at the receiver earlier than expected, and only one buffer is used to temporarily store data for processing. As shown in FIG. 2A, the receiver initially anticipated receiving the second transmission signal (i.e., the subsequent one of two consecutive transmission signals, although not shown in the figure) at the arrival time $AT2\_e$ within the period P2 of the second processing signal PS2. However, in reality, the second transmission signal arrives at the receiver at the arrival time AT2, falling within the period P1 of the first processing signal PS1, rather than within the expected period P2 of the second processing signal PS2. This implies that the arrival time of the second transmission signal has drifted to the previous processing period. Consequently, both transmission signals arrive at the receiver within the period P1 of the first processing signal PS1. In this scenario where only one buffer is used to temporarily store data for processing by the first processing signal PS1, the data associated with the arrival time AT1 will be overwritten by the data from the arrival time AT2, resulting in the data associated with the arrival time AT1 being dropped. Consequently, the first processing signal PS1 processes the data from the arrival time AT2, rather than the expected data from the arrival time AT1. Subsequently, since the buffer is not updated within the period P2 of the second processing signal PS2, the data from the arrival time AT2 is processed by the second processing signal PS2, leading to a repeated processing of the data from the arrival time AT2 by both the first processing signal PS1 and the second processing signal PS2.

Figure 2B:
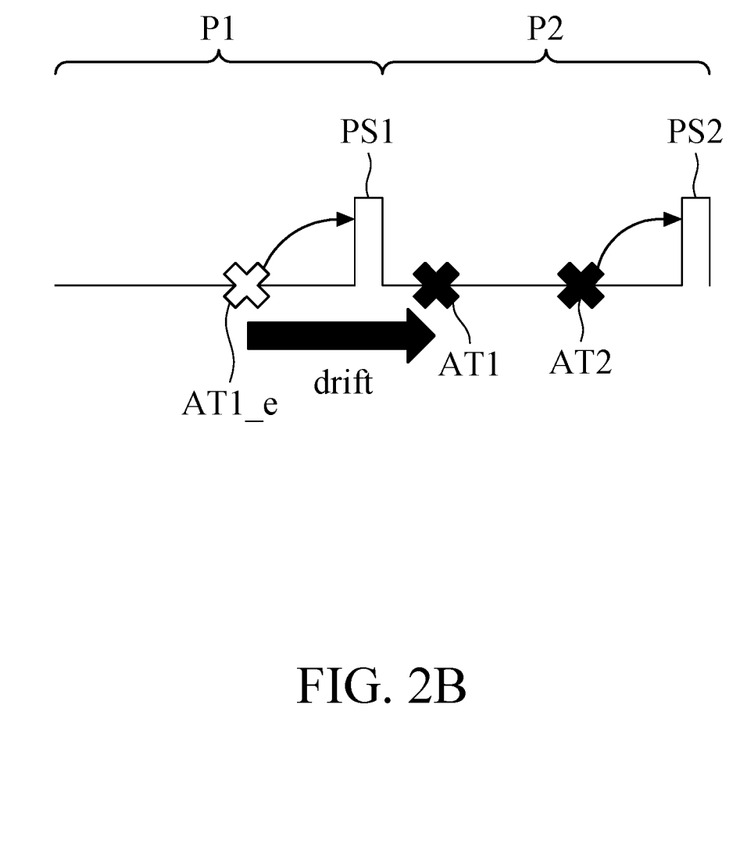
FIG. 2B is a time-domain graph illustrating a receiver's response in a scenario where a transmission signal arrives at the receiver later than expected, and only one buffer is used to temporarily store data for processing.

FIG. 2B is a time-domain graph illustrating a receiver's response in a scenario where a transmission signal arrives at the receiver later than expected, and only one buffer is used to temporarily store data for processing. As shown in FIG. 2B, the receiver initially anticipated receiving the first transmission signal (i.e., the precedent signal of two consecutive transmission signals, although not shown in the figure) at the arrival time $AT1\_e$ within the period P1 of the first processing signal PS1. However, in reality, the first transmission signal arrives at the receiver at the arrival time AT1, falling within the period P2 of the second processing signal PS2, rather than within the expected period P1 of the first processing signal PS1. This implies that the arrival time of the first transmission signal has drifted to the next processing period. Consequently, both transmission signals arrive at the receiver within the period P2 of the second processing signal PS2. In this scenario where only one buffer is used to temporarily store data for processing by the second processing signal PS2, the data associated with the arrival time AT1 will be overwritten by the data from the arrival time AT2, resulting in the data associated with the arrival time AT1 being dropped. Furthermore, since no data is received during period P1, the processing signal PS1 is compelled to repeatedly process data from even earlier signals.

Figure 3A:
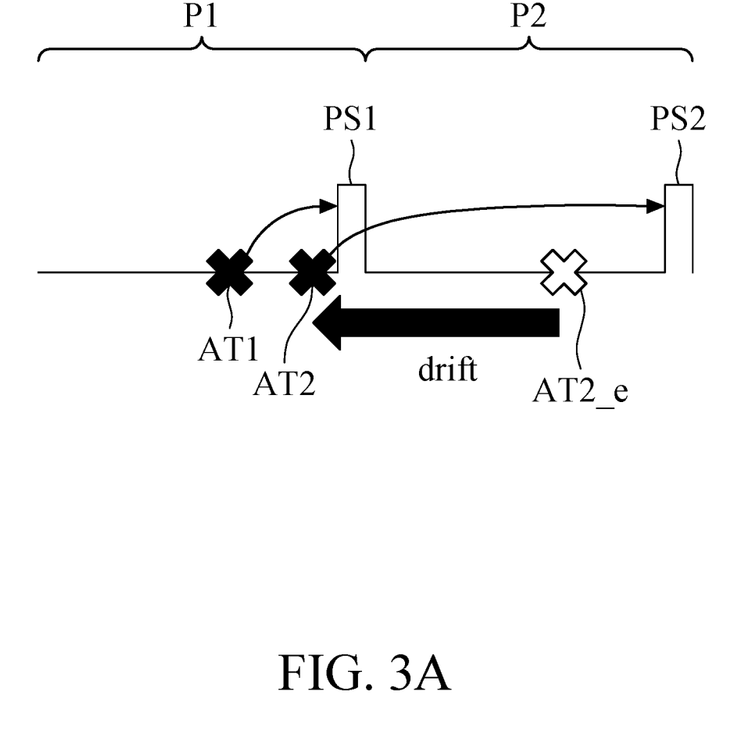
FIG. 3A is a time-domain graph illustrating a receiver's response in a scenario where a transmission signal arrives at the receiver earlier than expected, and two buffers are used to temporarily store data for processing.

FIG. 3A is a time-domain graph illustrating a receiver's response in a scenario where a transmission signal arrives at the receiver earlier than expected, and two buffers are used to temporarily store data for processing. In contrast to the scenario illustrated in FIG. 2A, the utilization of two buffers for tracking the data carried by the first and second transmission signals ensures that the data received at arrival times AT1 and AT2 will be processed by their respective processing signals PS1 and PS2. As a result, no data drop or repeat occurs, and both pieces of data are processed as scheduled.

Figure 3B:
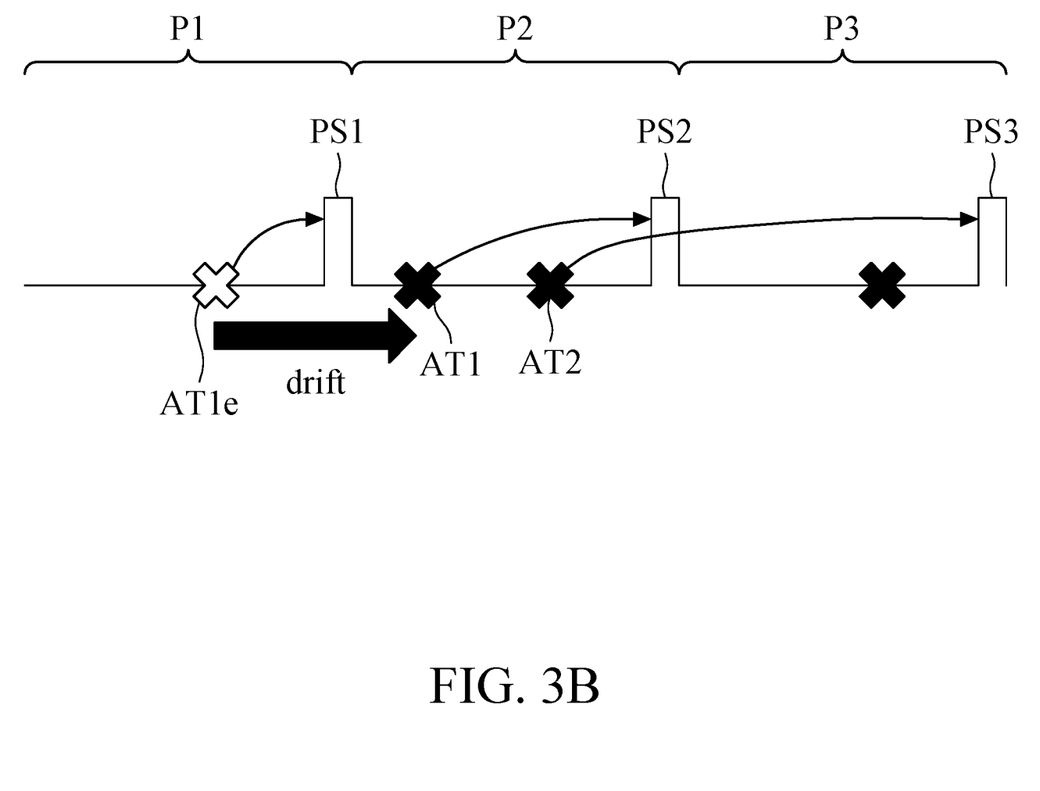
FIG. 3B is a time-domain graph illustrating a receiver's response in a scenario where a transmission signal arrives at the receiver later than expected, and two buffers are used to temporarily store data for processing.

FIG. 3B is a time-domain graph illustrating a receiver's response in a scenario where a transmission signal arrives at the receiver later than expected, and two buffers are used to temporarily store data for processing. In contrast to the scenario illustrated in FIG. 2B, the utilization of two buffers for tracking the data carried by the first and second transmission signals enables the processing of data received at arrival times AT1 and AT2 by the processing signals PS2 and PS3, respectively. Consequently, no data drop or repeat occurs. However, this implementation leads to an increase in latency. To elaborate further, the data originally intended to be processed by processing signal PS2 is delayed until processing signal PS3, and the data originally intended to be processed by processing signal P3 is further delayed until the next signal of the processing signal PS3. This delay has an impact on the overall system performance.

Figure 4:
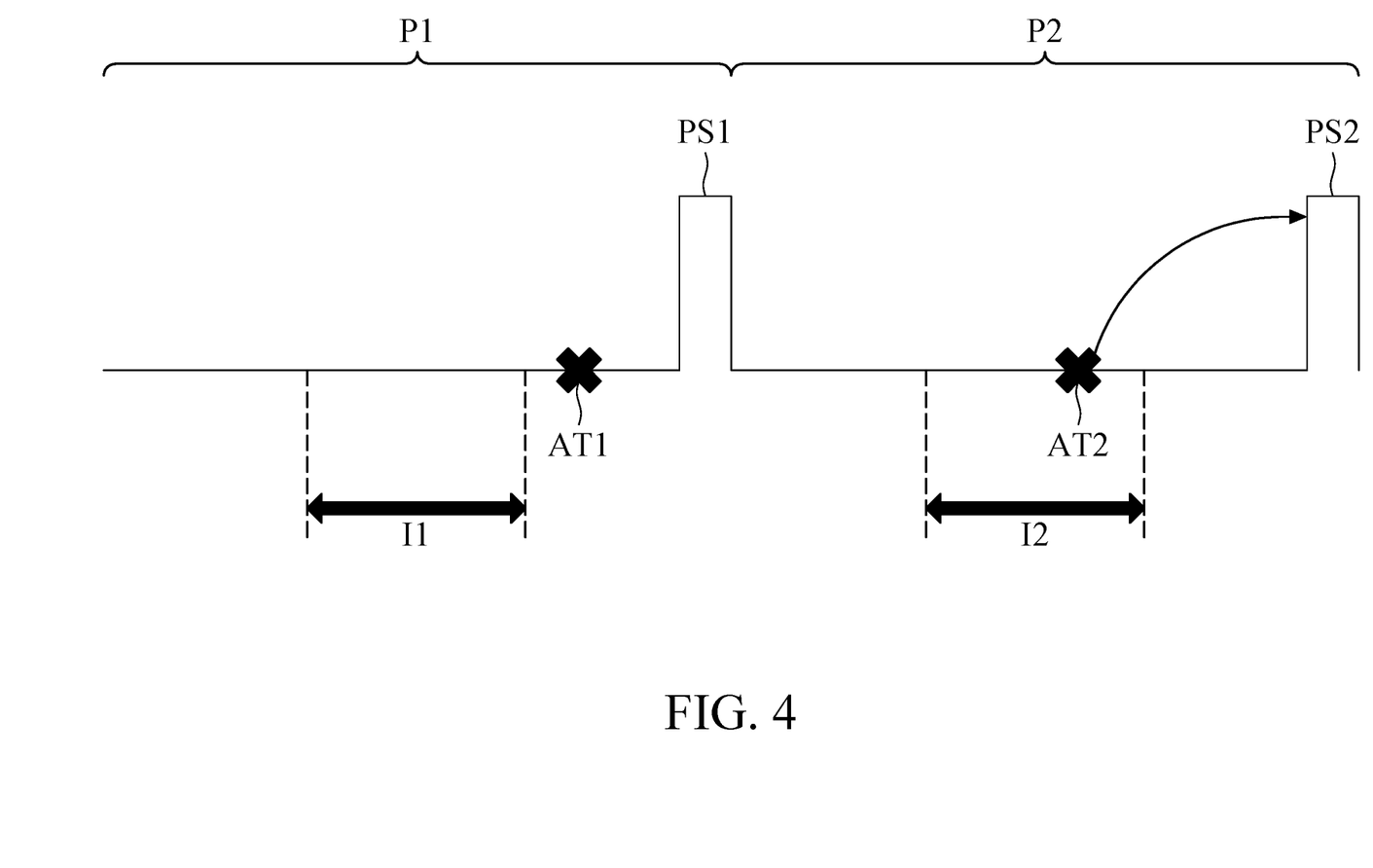
FIG. 4 is an exemplary time-domain graph demonstrating the concept of the digital signal processing method provided herein, according to an embodiment of the present disclosure.

FIG. 4 is an exemplary time-domain graph demonstrating the concept of the digital signal processing method provided herein, according to an embodiment of the present disclosure. The first ideal interval I1 and the second ideal interval I2 illustrated in FIG. 4 refer to specific durations within the first period P1 of the first processing signal PS1 and the second period P2 of the second processing signal PS2, respectively. According to an embodiment of the present disclosure, the relationship between the arrival time AT1 and the first ideal interval I1 is evaluated, serving as a basis to adjust or determine the duration of the second period P2 for the second processing signal PS2. This adjustment is in an endeavor to make the second arrival time AT2 fall within the second ideal interval I2, minimizing the potential for the second arrival time AT2 to extend beyond the second period P2. In the example illustrated in FIG. 4, the first transmission signal arrives at the first arrival time AT1, which occurs after the first ideal interval I1, indicating a tendency for the signal arrival time to drift forward (i.e., rightward on the timeline). Consequently, the duration of the second period P2 is extended, in order to prevent the second arrival time AT2 from drifting into the next period. More details about this embodiment and the variations thereof will be described later.

Figure 5:
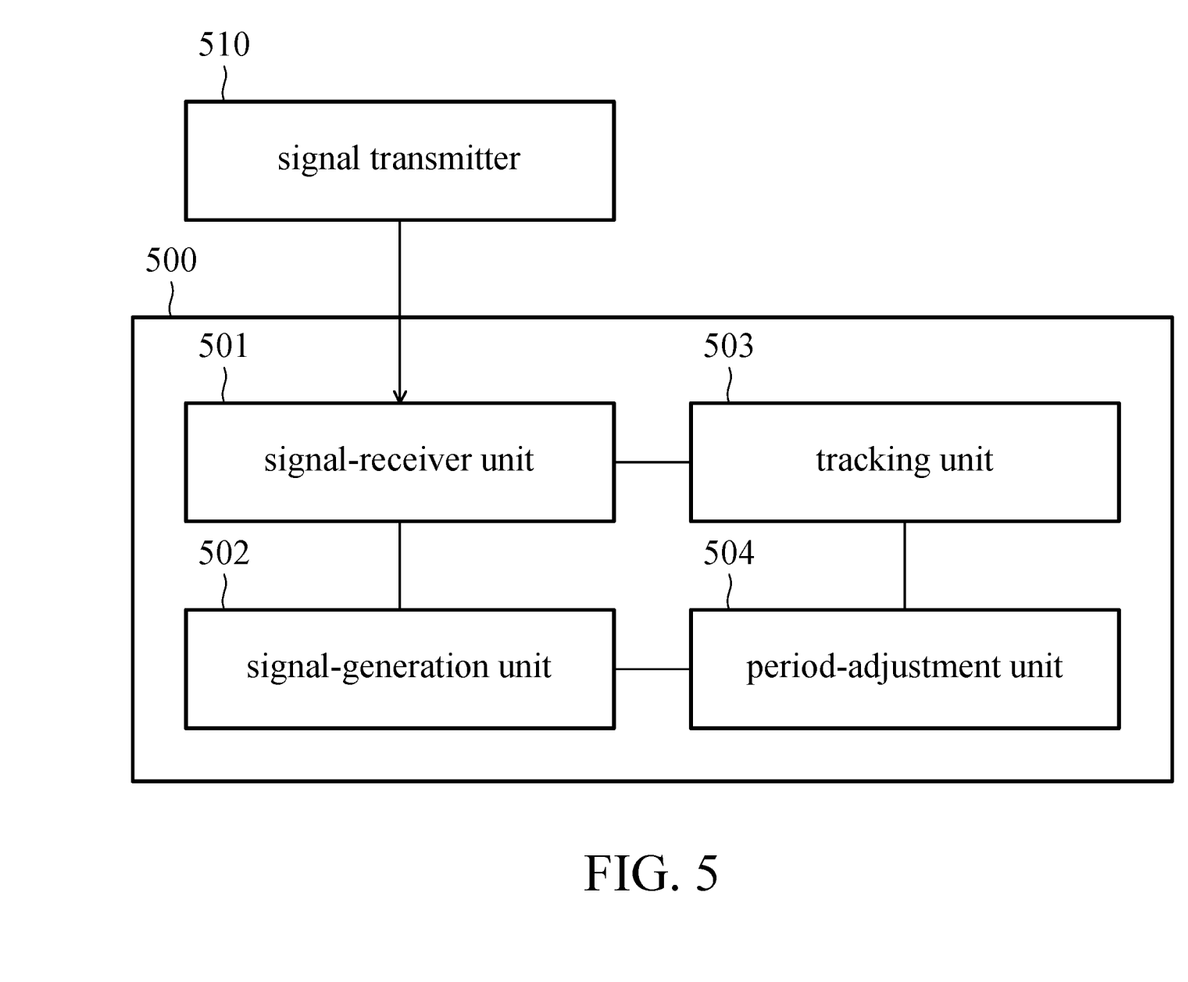
FIG. 5 illustrates the system block diagram of a digital signal processing system, according to an embodiment of the present disclosure.

FIG. 5 illustrates the system block diagram of a digital signal processing system 500, according to an embodiment of the present disclosure. As shown in FIG. 5, the system 500 may include a signal-receiver unit 501, a signal-generation unit 502, a tracking unit 503, and a period-adjustment unit 504.

The system 500 pertains to any receiving end within digital circuits, communication systems, or other related contexts, receiving transmission signals from the signal transmitter 510 via a communication interface, such as Universal Asynchronous Receiver/Transmitter (UART), Inter-Integrated Circuit (I2C), Serial Peripheral Interface (SPI), but the present disclosure is not limited thereto. For instance, the system 500 could be a graphics processing unit (GPU), with the signal transmitter 510 being a central processing unit (CPU) that sends signals to the GPU for image rendering. Alternatively, the system 500 could be a digital signal processor deployed in a display device, with the signal transmitter 510 being a GPU transmitting signals to the display device for video playing. In scenarios where the signal transmitter 510 is part of a high-speed communication system, the system 500 could be a network interface card (NIC) or a data receiver in a wireless communication setup.

The system 500 can be implemented using either a general-purpose processor or a special-purpose hardware circuitry. In an embodiment, the system 500 can be a processor, a controller, a microprocessor, or a microcontroller, that loads a program or an instruction set from a storage unit (which may include both volatile and non-volatile memories) to carry out the functions of the signal-receiver unit 501, the signal-generation unit 502, the tracking unit 503, and the period-adjustment unit 504. In another embodiment, the system 500 may include one or more integrated circuits, such as application-specific integrated circuits (ASICs) and/or field programmable gate arrays (FPGAs), that are dedicated to implementing the signal-receiver unit 501, the signal-generation unit 502, the tracking unit 503, and the period-adjustment unit 504.

According to an embodiment of the present disclosure, the signal-receiver unit 501 is configured to receive a sequence of transmission signals from the signal transmitter 510. The transmission signal sequence includes a first transmission signal and a second transmission signal next to the first transmission signal.

According to an embodiment of the present disclosure, the signal-generation unit 502 is configured to generate a sequence of processing signals. The processing signal sequence includes a first processing signal (PS1 as shown in FIG. 4) and a second processing signal (PS2 as shown in FIG. 4) next to the first processing signal. The first processing signal and the second processing signal respectively correspond to the first transmission signal and the second transmission signal. In some embodiments, the system 500 is deployed in a display device, and processing signal sequence is a sequence of vertical sync (VSync) signals, which constrain the GPU during the rendering of 3D graphics, synchronizing the output signal of the GPU with the refresh rate of the display to eliminate screen tearing artifacts.

According to an embodiment of the present disclosure, the tracking unit 503 is configured to keep track of the first arrival time (AT1 as shown in FIG. 4) of the first transmission signal. The first arrival time will then serve as a basis for the period-adjustment unit 504 to adjust the duration of the second period (P2 as shown in FIG. 4) for the second processing signal PS2.

In some embodiments, the first arrival time can be tracked in various forms of commonly used timestamps, such as Unix time, Epoch time, ISO 8601, RFC 2822, or in the form of a custom timestamp, but the present disclosure is not limited thereto.

According to an embodiment of the present disclosure, the period-adjustment unit 504 is configured to adjust the duration of the second period based on the first arrival time and the first ideal interval (I1 as shown in FIG. 4) with a specified duration in the first period of the first processing signal, and cause the signal-generation unit 502 to generate the second processing signal with the second period. The specified duration can be a specified proportion of a base period's duration (e.g., 70% of base period's duration 1000000 μs=16666 μs), but the present disclosure is not limited thereto.

In some embodiments, the midpoint of the first ideal interval within the first period is aligned with the midpoint of the first period. In most cases, this alignment contributes to the reduction of the possibility of the second arrival time falling outside of the second period.

Figure 6:
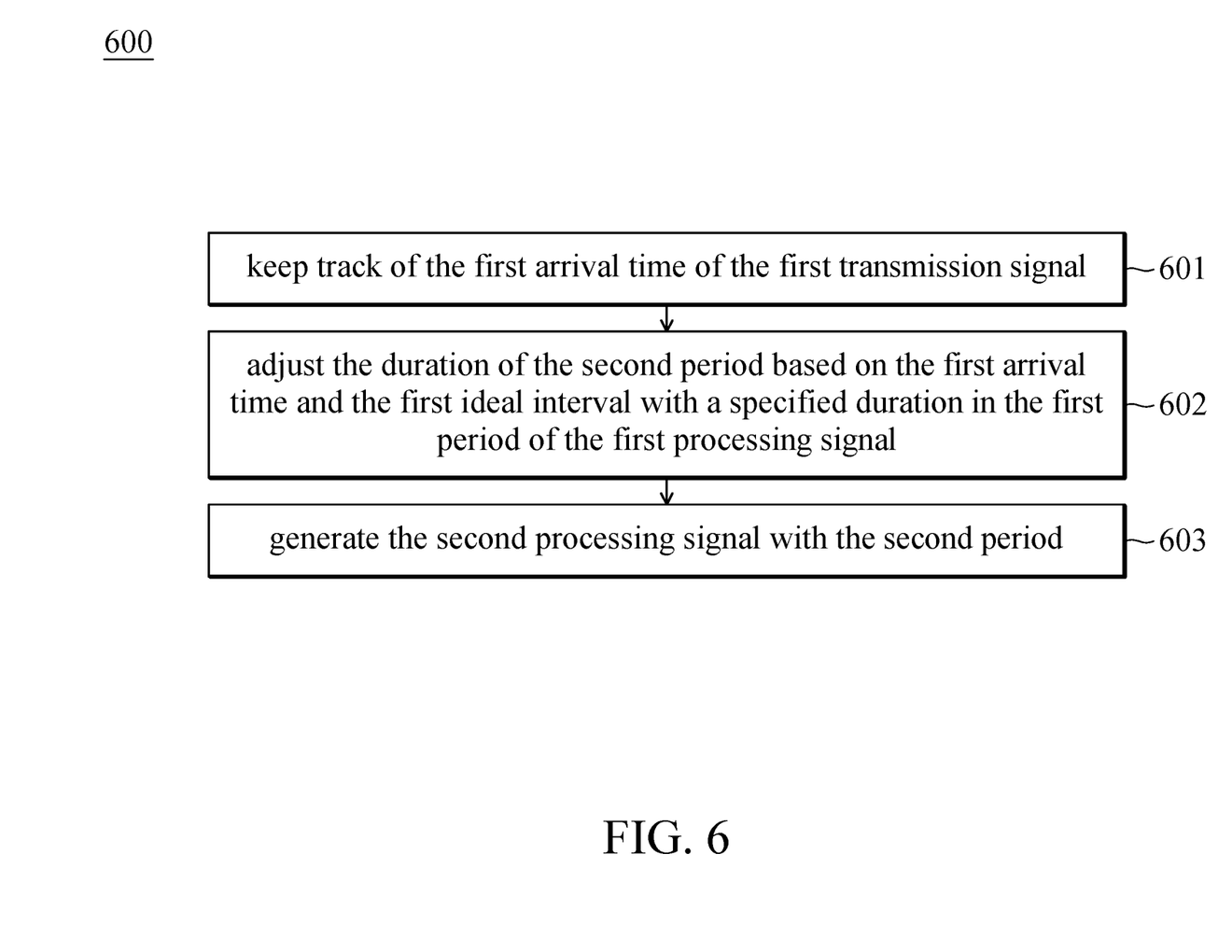
FIG. 6 illustrates the flow diagram of a digital signal processing method, according to an embodiment of the present disclosure.

FIG. 6 illustrates the flow diagram of a digital signal processing method 600, for use in the digital signal processing system 500, according to an embodiment of the present disclosure. As shown in FIG. 6, method 600 may include operations 601-603.

Operation 601: Keeping track of the first arrival time (AT1 as shown in FIG. 4) of the first transmission signal. This operation can be performed by the tracking unit 503 illustrated in FIG. 5.

Operation 602: Adjusting the duration of the second period (P2 as shown in FIG. 4) based on the first arrival time and the first ideal interval (I1 as shown in FIG. 4) with a specified duration in the first period (P1 as shown in FIG. 4) of the first processing signal (PS1 as shown in FIG. 4). This operation can be performed by the period-adjustment unit 504 illustrated in FIG. 5.

Operation 603: Generating the second processing signal (PS2 as shown in FIG. 4) with the second period. This operation can be performed by the signal-generation unit 502 illustrated in FIG. 5.

Figure 7:
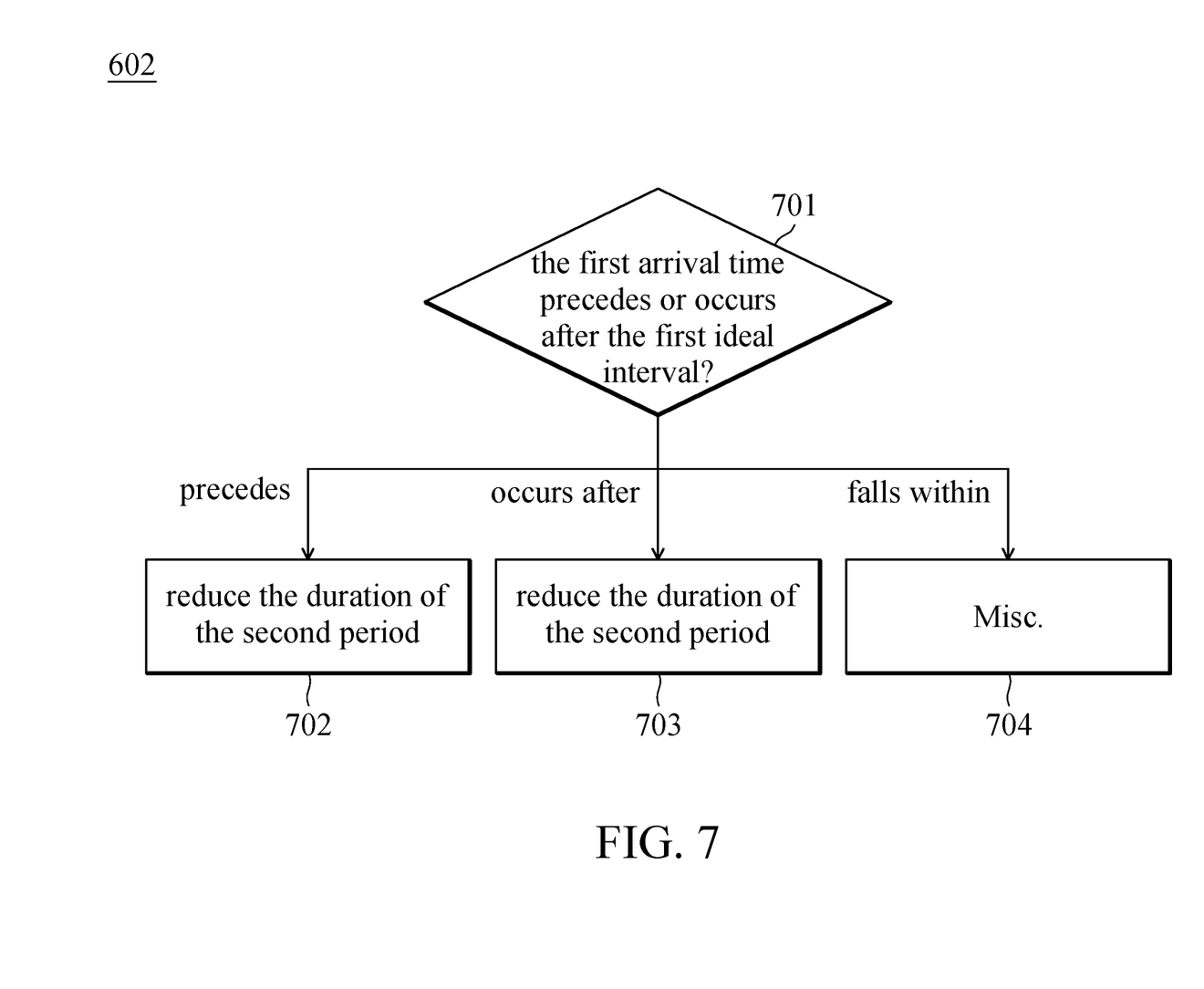
FIG. 7 illustrates the flow diagram of more detailed operations of adjusting the duration of the second period, according to an embodiment of the present disclosure.

FIG. 7 illustrates the flow diagram of more detailed operations of the operation 602, according to an embodiment of the present disclosure. As shown in FIG. 7, operation 602 may further includes operations 701-704.

Operation 701: Checking whether the first arrival time precedes or occurs after the first ideal interval. If the first arrival time precedes the first ideal interval, the method proceeds to operation 702. If the first arrival time occurs after the first ideal interval, the method proceeds to operation 703. In the case where neither of the above conditions is met, indicating that the first arrival time falls within the first ideal interval, the method proceeds to operation 704.

Operation 702: Reducing the duration of the second period. The extent of reduction may be fixed, or it can be determined based on the distance between the first arrival time and the midpoint of the first ideal interval, but the present disclosure is not limited thereto.

Operation 703: Increasing the duration of the second period. The extent of increase may be fixed, or it can be determined based on the distance between the first arrival time and the midpoint of the first ideal interval, but the present disclosure is not limited thereto.

Operation 704 can involve, for example, keeping the duration of the second period unchanged, continuing to follow the adjustment strategies of its precedent periods, or considering any suitable adjustments based on other factors, but the present disclosure is not limited thereto.

In some embodiments, the adjustment of the second period's duration involves not only referencing the first arrival time of the first transmission signal but also referencing the arrival times of N consecutive transmission signals before the first transmission signal, where N is a specified integer and the value thereof is not limited by the present disclosure. In other words, N+1 consecutive transmission signals (including the first transmission signal) that are directly succeeded by the second transmission signal are taken into account when determining the adjustment of the second period's duration. Such comprehensive approach allows for a more accurate assessment of the trend of arrival time drifting, enabling a more precise adjustment of the second period's duration.

Figure 8:
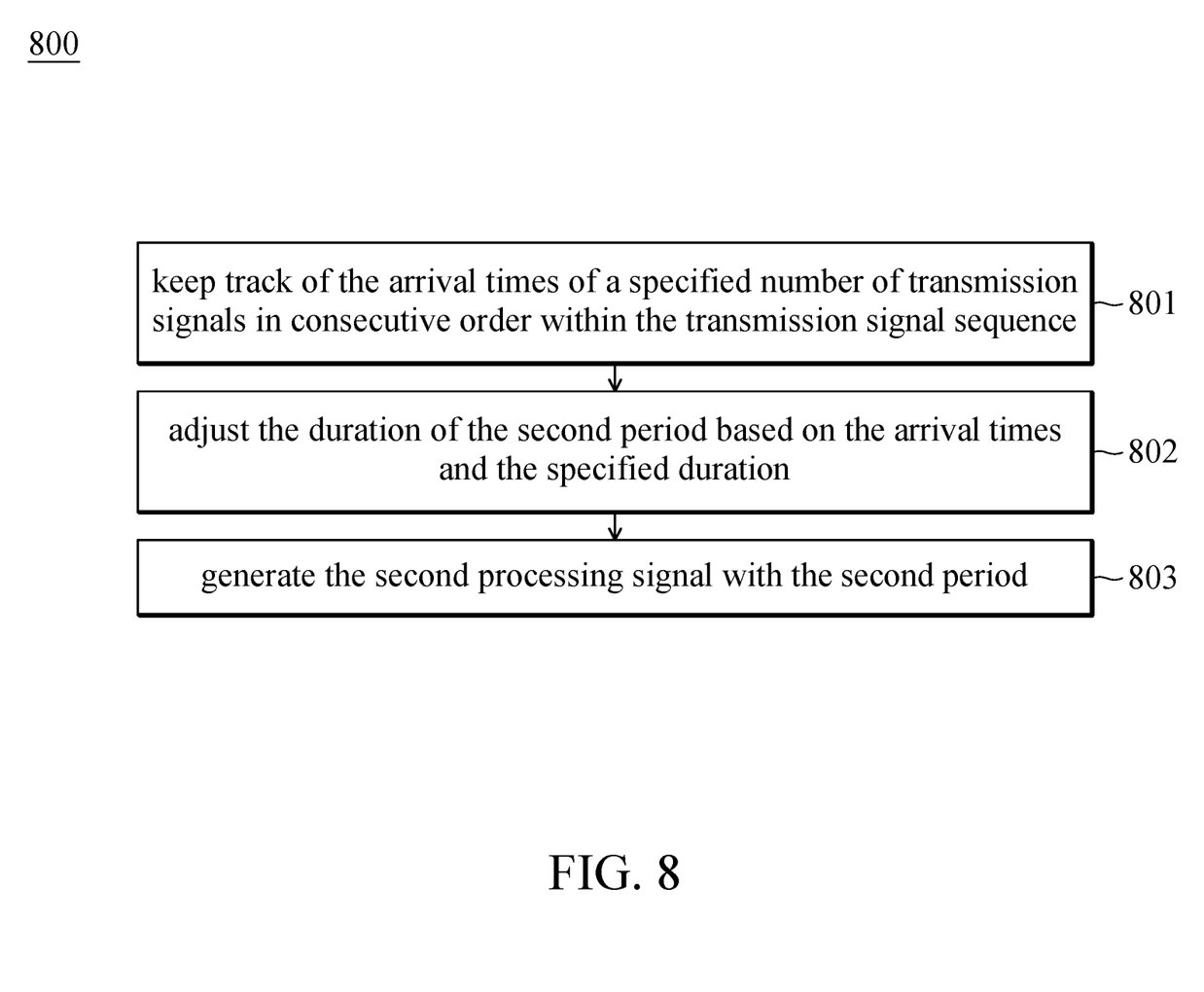
FIG. 8 illustrates the flow diagram of a digital signal processing method, according to an embodiment of the present disclosure.

FIG. 8 illustrates the flow diagram of a digital signal processing method 800, for use in the digital signal processing system 500, according to an embodiment of the present disclosure. As shown in FIG. 8, method 800 may include operations 801-803. In contrast to method 600, method 800 takes into account not only the first arrival time of the first transmission signal but also the arrival times of additional transmission signals within the transmission signal sequence, when determining the adjustment of the second period's duration.

Operation 801: Keeping track of the arrival times of a specified number of transmission signals in consecutive order within the transmission signal sequence. These transmission signals are directly succeeded by the second transmission signal. The first transmission signal is the most recent one within these transmission signals. The specified number is not limited by the present disclosure. This operation can be performed by the tracking unit 503 illustrated in FIG. 5.

In some embodiments, the arrival times can be tracked in various forms of commonly used timestamps, such as Unix time, Epoch time, ISO 8601, RFC 2822, or in the form of a custom timestamp, but the present disclosure is not limited thereto.

Operation 802: Adjusting the duration of the second period based on the arrival times (of said specified number of transmission signals) and the specified duration. This operation can be performed by the period-adjustment unit 504 illustrated in FIG. 5.

Operation 803: Generating the second processing signal with the second period. This operation can be performed by the signal-generation unit 502 illustrated in FIG. 5.

Figure 9:
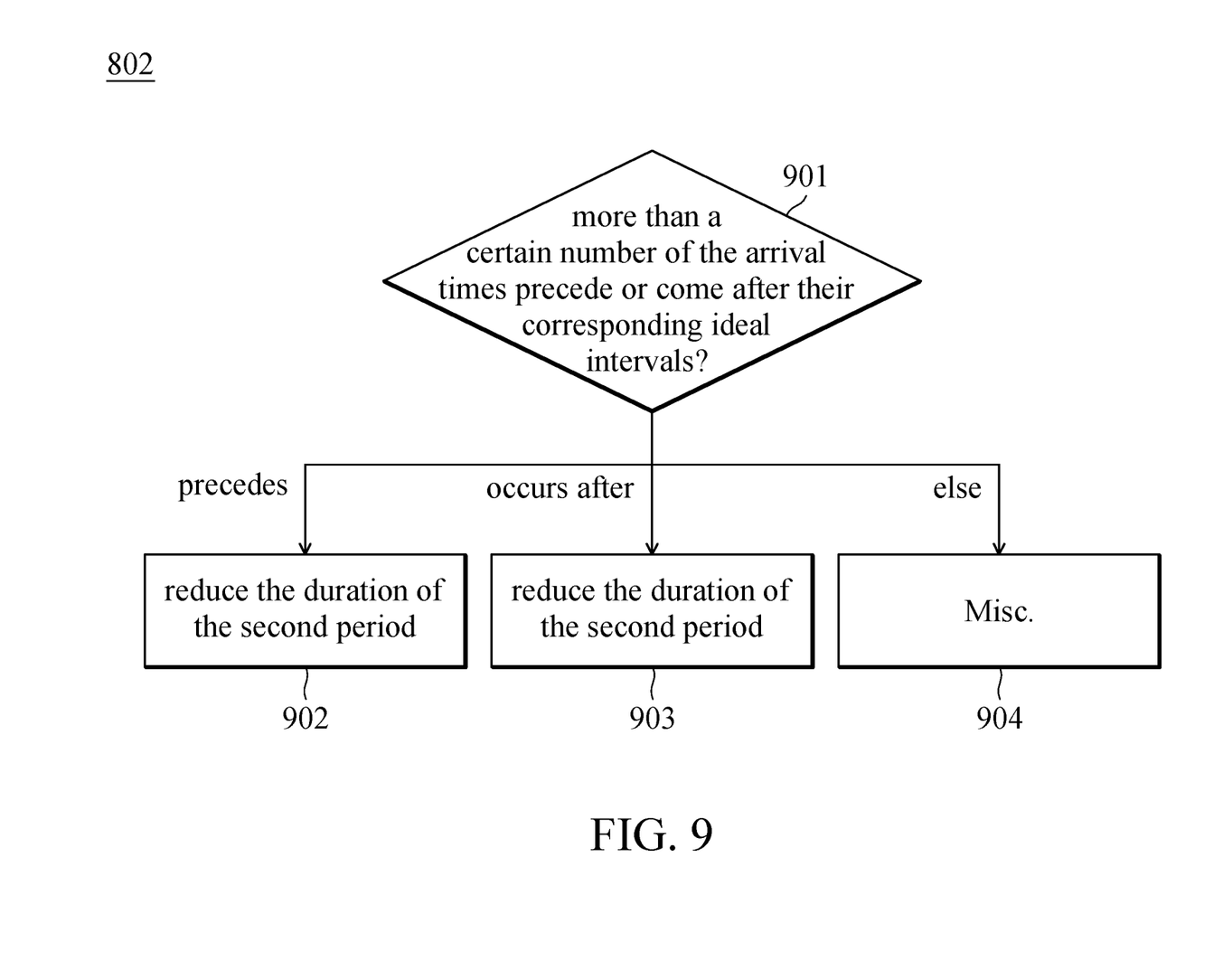
FIG. 9 illustrates the flow diagram of more detailed operations of adjusting the duration of the second period, according to an embodiment of the present disclosure.

FIG. 9 illustrates the flow diagram of more detailed operations of the operation 802, according to an embodiment of the present disclosure. As shown in FIG. 9, operation 802 may further includes operations 901-904.

Operation 901: Checking whether more than a certain number of the arrival times (of said specified number of transmission signals) precede or occur after their corresponding ideal intervals with the specified duration. The value of said certain number is not limited by the present disclosure, except that it must not be above said specified number. If more than said number of the arrival times precede their corresponding ideal intervals, the method proceeds to operation 902. If more than said number of the arrival times occur after their corresponding ideal intervals, the method proceeds to operation 903. In the case where neither of the above conditions is met, indicating that no more than said number of the arrival time falls outside of their corresponding ideal intervals, the method proceeds to operation 904.

For example, with a specified number of 10 and a certain number of 3, this implies that 10 arrival times (of the 10 transmission signals) are tracked, as per operation 801. Operation 901 then checks whether more than 3 out of the 10 arrival times precede or occur after their corresponding ideal intervals of the specified duration.

Furthermore, it is noteworthy that the phenomenon of signal arrival time drifting typically exhibits temporal autocorrelation. Specifically, the arrival time of a given signal tends not to exhibit random jumps, but rather is influenced by the arrival times of one or more preceding signals, exhibiting similar drift patterns as seen before, such as drifting forward or backward. Consequently, as long as said specified number and certain number are not set excessively high, there will not be a scenario where both the conditions of operation 902 (more than said number of arrival times preceding their corresponding ideal intervals) and operation 903 (more than said number of arrival times occurring after their corresponding ideal intervals) are simultaneously met.

Operation 902: Reducing the duration of the second period. The extent of reduction may be fixed, or it can be determined based on the distances between the arrival times and the midpoints of their corresponding ideal intervals, but the present disclosure is not limited thereto.

Operation 903: Increasing the duration of the second period. The extent of increase may be fixed, or it can be determined based on the distances between the arrival times and the midpoints of their corresponding ideal intervals, but the present disclosure is not limited thereto.

Operation 904 can involve, for example, keeping the duration of the second period unchanged, continuing to follow the adjustment strategies of its precedent periods, or considering any suitable adjustments based on other factors, but the present disclosure is not limited thereto.

Figure 10:
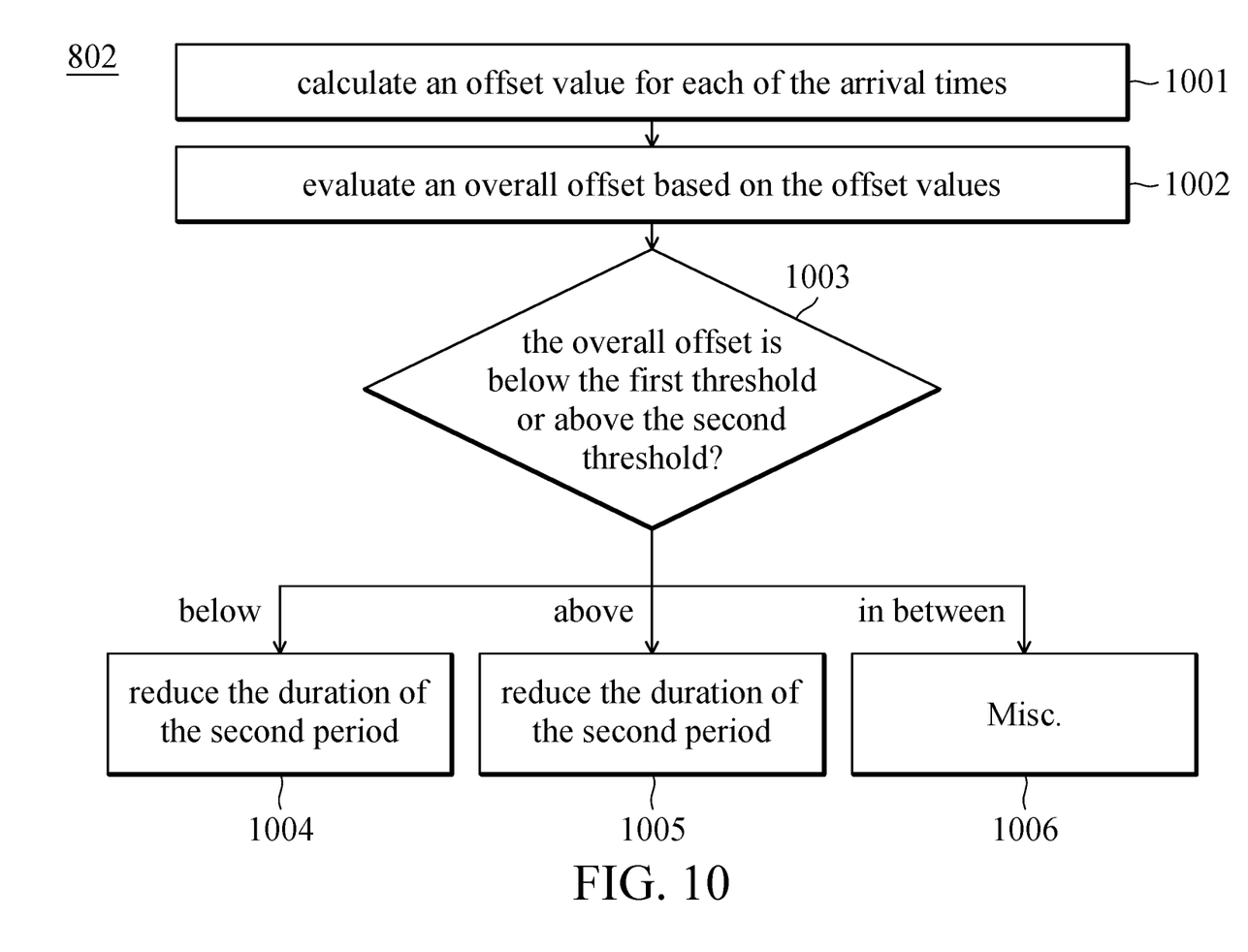
FIG. 10 illustrates the flow diagram of more detailed operations of adjusting the duration of the second period, according to another embodiment of the present disclosure.

FIG. 10 illustrates the flow diagram of more detailed operations of the operation 802, according to another embodiment of the present disclosure. As shown in FIG. 10, operation 802 may further includes operations 1001-1006.

Operation 1001: Calculating an offset value for each of the arrival times. The offset value represents directional time difference between the arrival time and the midpoint of its corresponding ideal interval with the specified duration. For example, if the arrival time is 11000 $\mu s$ (measured from a reference time point) and the midpoint of its corresponding ideal interval is 10000 $\mu s$, then the offset value will be calculated as 11000−10000=1000. Similarly, if the arrival time is 9000 $\mu s$ and the midpoint of its corresponding ideal interval is 10000 $\mu s$, then the offset value will be calculated as 9000−10000=−1000.

Operation 1002: Evaluating an overall offset based on the offset values. This evaluation of the overall offset can use various statistical measures indicative of central tendency within the dataset, such as arithmetic mean, geometric mean, weighted mean (e.g., with temporal weighting), truncated mean, median, etc., but the present disclosure is not limited thereto.

Operation 1003: Checking if the overall offset is below the first threshold or above the second threshold. The second threshold is above the first threshold, and the difference between the first threshold and the second threshold is the specified duration. In other words, operation 1003 checks if the overall offset fall within an interval having the specified duration, and the upper bound and lower bound of this interval are respectively the second threshold and the first threshold. If the overall offset is below the first threshold, indicating that the arrival times (of said specified number of transmission signals) are inclined to drift backward, the method proceed to operation 1004. If the overall offset is above the first threshold, indicating that the arrival times are inclined to drift forward, the method proceed to operation 1005. In the case where neither of the above conditions is met, indicating that the overall offset is in between the first threshold and the second threshold, the method proceeds to operation 1006.

Operation 1004: Reducing the duration of the second period. The extent of reduction may be fixed, or it can be determined based on the overall offset, but the present disclosure is not limited thereto.

Operation 1005: Increasing the duration of the second period. The extent of increase may be fixed, or it can be determined based on the overall offset, but the present disclosure is not limited thereto.

Operation 1006 can involve, for example, keeping the duration of the second period unchanged, continuing to follow the adjustment strategies of its precedent periods, or considering any suitable adjustments based on other factors, but the present disclosure is not limited thereto.

The digital signal processing system and digital signal processing method provided by various embodiments of the present disclosure endeavor to make the arrival time of the signal fall within an ideal interval. This effectively mitigates the issues associated with arrival time drifting, preventing drop/repeat bursts without compromising system performance.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital signal processing system, comprising:
    a signal-receiver unit, configured to receive a transmission signal sequence that includes a first transmission signal and a second transmission signal next to the first transmission signal;
    a signal-generation unit, configured to generate a processing signal sequence that includes a first processing signal and a second processing signal next to the first processing signal, wherein the first processing signal and the second processing signal respectively correspond to the first transmission signal and the second transmission signal;
    a tracking unit, configured to keep track of a first arrival time of the first transmission signal; and
    a period-adjustment unit, configured to adjust duration of a second period based on the first arrival time and a first ideal interval with a specified duration in a first period of the first processing signal, and cause the signal-generation unit to generate the second processing signal with the second period.

2. The digital signal processing system as claimed in claim 1, wherein the period-adjustment unit is further configured to adjust the duration of the second period by performing the following operations:
    checking whether the first arrival time precedes or occurs after the first ideal interval;
    reducing the duration of the second period if the first arrival time precedes the first ideal interval; and
    increasing the duration of the second period if the first arrival time occurs after the first ideal interval.

3. The digital signal processing system as claimed in claim 1, wherein midpoint of the first ideal interval within the first period is aligned with the midpoint of the first period.

4. The digital signal processing system as claimed in claim 1, wherein the tracking unit is further configured to keep track of arrival times of a specified number of transmission signals in consecutive order within the transmission signal sequence, and said specified number of transmission signals are directly succeeded by the second transmission signal; and
    wherein the period-adjustment unit is further configured to adjust the duration of the second period based on the arrival times and the specified duration.

5. The digital signal processing system as claimed in claim 4, wherein the period-adjustment unit is further configured to adjust the duration of the second period by performing the following operations:
    checking whether more than a certain number of the arrival times precede or occur after their corresponding ideal intervals with the specified duration;
    increasing the duration of the second period if more than said number of the arrival times occur after their corresponding ideal intervals; and
    reducing the duration of the second period if more than said number of the arrival times precedes their corresponding ideal intervals.

6. The digital signal processing system as claimed in claim 4, wherein the period-adjustment unit is further configured to adjust the duration of the second period by performing the following operations:
    calculating an offset value for each of the arrival times, wherein the offset value represents directional time difference between the arrival time and a midpoint of a corresponding ideal interval with the specified duration;
    evaluating an overall offset based on the offset values;
    checking if the overall offset is below a first threshold or above a second threshold, wherein the second threshold is above the first threshold, and the difference between the first threshold and the second threshold is the specified duration;
    reducing the duration of the second period if the overall offset is below the first threshold; and
    increasing the duration of the second period if the overall offset is above the second threshold.

7. The digital signal processing system as claimed in claim 1, wherein the processing signal sequence is a sequence of vertical sync signals.

8. A digital signal processing method, for use in a digital signal processing system that receives a transmission signal sequence and generates a processing signal sequence, wherein the transmission signal sequence includes a first transmission signal and a second transmission signal next to the first transmission signal, wherein the processing signal sequence includes a first processing signal and a second processing signal next to the first processing signal, wherein the first processing signal and the second processing signal respectively correspond to the first transmission signal and the second transmission signal, and wherein the method comprises the following operations:

keeping track of a first arrival time of the first transmission signal;

adjusting duration of a second period based on the first arrival time and a first ideal interval with a specified duration in a first period of the first processing signal; and generating the second processing signal with the second period.

9. The method as claimed in claim 8, wherein the operation of adjusting the duration of the second period comprises:

checking whether the first arrival time precedes or occurs after the first ideal interval;

reducing the duration of the second period if the first arrival time precedes the first ideal interval; and increasing the duration of the second period if the first arrival time occurs after the first ideal interval.

10. The method as claimed in claim 8, further comprising:
aligning midpoint of the first ideal interval within the first period with the midpoint of the first period.

11. The method as claimed in claim 8, further comprising:
keeping track of arrival times of a specified number of transmission signals in consecutive order within the transmission signal sequence, wherein said specified number of transmission signals are directly succeeded by the second transmission signal; and adjusting the duration of the second period based on the arrival times and the specified duration.

12. The method as claimed in claim 11, wherein the operation of adjusting the duration of the second period comprises:

checking whether more than a certain number of the arrival times precede or occur after corresponding ideal intervals with the specified duration;

increasing the duration of the second period if more than said number of the arrival times occur after their corresponding ideal intervals; and reducing the duration of the second period if more than said number of the arrival times precedes their corresponding ideal intervals.

13. The method as claimed in claim 11, wherein the operation of adjusting the duration of the second period comprises:

calculating an offset value for each of the arrival times, wherein the offset value represents directional time difference between the arrival time and a midpoint of its corresponding ideal interval with the specified duration;

evaluating an overall offset based on the offset values; and checking if the overall offset is below a first threshold or above a second threshold, wherein the second threshold is above the first threshold, and the difference between the first threshold and the second threshold is the specified duration;

reducing the duration of the second period if the overall offset is below the first threshold; and increasing the duration of the second period if the overall offset is above the second threshold.

14. The method as claimed in claim 8, wherein the processing signal sequence is a sequence of vertical sync signals.

* * * * *